Patented Feb. 19, 1924.

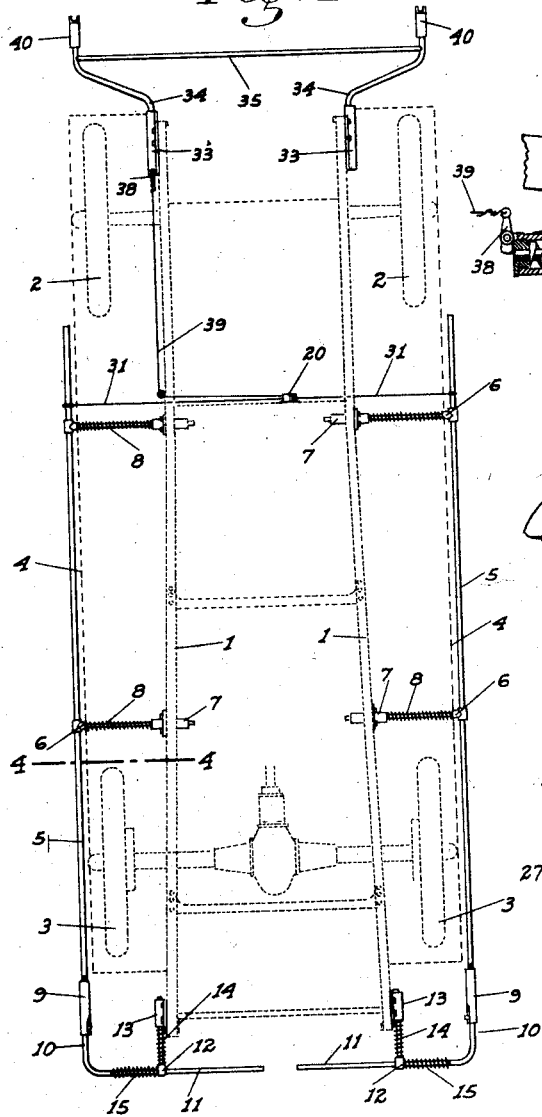

1,484,333

UNITED STATES PATENT OFFICE.

OSCAR E. JONES, OF MARYSVILLE, CALIFORNIA.

SAFETY FENDER FOR AUTOMOBILES.

Application filed March 28, 1923. Serial No. 628,251.

*To all whom it may concern:*

Be it known that I, OSCAR E. JONES, a citizen of the United States, residing at Marysville, county of Yuba, State of California, have invented certain new and useful Improvements in Safety Fenders for Automobiles; and I do declare the following to be a full, clear, and exact description of the same, reference being had to the accompanying drawings, and to the characters of reference marked thereon, which form a part of this application.

This invention relates to improvements in fender or bumper devices for automobiles, the principal object of my invention being to provide a structure by means of which the vehicle will be protected against damage from blows delivered both along the sides and at both ends of the vehicle.

Another object is to provide means whereby on any vehicle equipped with my device the speed of the car when struck or striking another car or any other object will be recorded at the time.

This latter feature is of especial value in the event of a dispute arising after an accident has occurred, and will do away with the uncertainty and unreliability of unsupported testimony as to the speed of the car at the time of the accident, which with present equipment cannot be verified, and is frequently minimized by the offenders, magnified by the victims, and guessed at by any eye witnesses.

With my improved device, a visual record of the speed of a car, which may be used as evidence in a court trial, will be had, and the rights of victims, especially pedestrains, will be greatly safeguarded.

Another object of my invention is to provide means whereby if one vehicle equipped with my structure runs into another one similarly equipped, both cars will be locked together, and the driver of the offending vehicle cannot instantly back away and leave the scene, as now frequently occurs, especially when the car struck is parked and the driver absent.

These objects I accomplish by means of such structure and relative arrangement of parts as will fully appear by a perusal of the following specification and claims.

In the drawings similar characters of reference indicate corresponding parts in the several views.

Fig. 1 is a top plan outline of the chassis of an automobile, showing my improved structure mounted thereon.

Fig. 2 is an enlarged sectional view of a front fender and catching device.

Fig. 3 is an enlarged fragmentary perspective of a rear end portion of the structure.

Fig. 4 is a cross section taken on the line 4—4 of Fig. 1.

Fig. 5 is a face view of a speedometer equipped with a recording means actuated by a movement of one of the fenders.

Fig. 6 is a partial cross section of the speedometer.

Referring now more particularly to the characters of reference on the drawings the numeral 1 denotes the side frames of an automobile, having front and rear wheels 2 and 3 and the usual running boards 4.

Positioned parallel to the ground and running boards and preferably extending below the latter from a point just at the rear of the front wheels to a suitable point beyond the rear of the rear wheels are round fender-bars 5, turnably mounted in suitably disposed supports 6 extending at right angles to the bars and transversely of the vehicle, and slidably mounted in brackets 7 secured on and depending from the frames 1. Compression springs 8 are placed on the supports 6 between the brackets 7 and the bars 5, acting to hold the supports and bars outwardly.

Turnably mounted on the rear ends of the bars 5 are sleeves 9, in which slide and turn bars 10 which beyond said sleeves are bent to extend toward each other across the back of the vehicle, to form back fenders or bumpers 11, said bumpers terminating short of each other. Each bumper 11 is slidably mounted in a support 12, itself slidably mounted in a bracket 13 projecting rearwardly from and secured on the frames 1. Compression springs 14 are about the supports 12 between the brackets and bumpers 11, and similar springs 15 are about the latter and bear against the outer faces of the supports.

Projecting from the bars 10 are pins 16, slidable in slots 17 cut in the sleeves 9, said slots being so shaped as to cause a certain degree of rotation of the sleeves with an initial telescopic movement of said bars, and then permitting further telescopic movement without any rotation of said sleeves.

Depending from the sleeves are fins 18, which overlap similar fins 19 on the bars 5, the overlap being so arranged, with regard to the slant of the slots 17, that as the sleeves are rotated by the movement of the pins in said slots, the bars 5 are likewise rotated, but the latter are free to be turned independent of the sleeves.

Mounted on the dash of the car in the usual location is a speedometer 20, of the needle and dial type. This may be substituted for the one already on the vehicle, or the latter may be used, if it is of this type.

This speedometer has a dial 21 slidably mounted relative to the stem 22 of the indicating needle 23 for movement to and away from the latter, being normally held in the last named position by suitably disposed spring means as indicated at 24 (Fig. 6), the needle being operated in the usual manner.

Mounted with the needle and projecting toward but normally spaced from the dial is a crayon point 25, adapted to mark on the dial.

Secured on the back face of the latter are opposed wedge-cams 26 adapted to be engaged by similar cams 27 mounted on the ends of an arm 28 turnable on the stem 22 behind the dial, a spring 29 normally holding the arm away from the dial cams.

A cord or pull-wire 30 extends from said arm to the periphery of the speedometer casing, and is there attached in common to similar cords or wires 31 extending to and wrapped somewhat around the bars 5.

It will thus be seen that if either of the bumpers 11 moves toward the car so as to turn the corresponding bar 5, or the latter are rotated independently, the immediate result will be to pull on the cords, draw the dial up against the crayon 25, and as the needle moves toward zero as the speed of the car is checked, as it naturally would be when striking another car or obstacle or upon being struck, a visible mark as at 32, starting from the highest speed indicated at the time by the needle, will be made on the dial, serving as uncontrovertible evidence in the event of a dispute arising as to the speed of the car at the time.

The sleeves 9 are rotated by movement of the pins 16 in the slots 17 just sufficient to move the dial the required distance, so that no straining or distortion of the pull wires or dial is had. If the speedometer already on the car is used, the dial 21 is a false one placed in front of the regular dial.

The bars 5 are rotated independent of the sleeves 9 in the following manner:

Mounted on the frames 1 at their forward ends are brackets 33 in which are slidably mounted bars 34, extending longitudinally of the vehicle, and connected together by a cross arm 35. Each bar 34 has a pair of longitudinally spaced springs 36 and 37 inside its bracket, the spring 36 being relatively light and taking the initial shock of movement of the bar 34, and the heavier spring 37 then taking the load.

The rear end of one of the bars 34, beyond its bracket, is adapted when moved rearwardly to immediately engage one end of a small lever 38 pivoted on the bracket, and to the opposite end of which is connected a pull wire 39, leading to the cord 30 of the speedometer member 28 and connected thereto in common with the wires 31. The lever 38 is so arranged with respect to the bar 34 that the former will only be moved the distance necessary to cause the arm 28 to move and throw the dial forwardly and then rides on the bar 34 with any further rearward movement of the latter, thus preventing excessive movement of the wire 39 and parts connected thereto.

The springs 36 are sufficiently sensitive to cause the bars 34 to move back, and a speed indication to be made, when a relatively light object, such as a person, is struck.

Secured on the front end of the bars 34 are rigid and vertically disposed forks 40, having pivoted therein opposed and cooperating bell cranks 41, one of each of whose arms extends forwardly of the apex of the forks and overlap, as shown in Fig. 2, there being a lead or similar easily breakable pin 42 passed through the overlapped ends and normally holding them in such position.

To function properly, the forks are set, by suitable adjustment of the brackets 33, so that their apexes are substantially in line with the side and rear fender bars 5 and 11 of other vehicles, which would all be set at a specified height from the ground.

When the forks strike the side bars 5, they will first engage the depending fins, and cause rotation of the bars, in the only direction made possible by the fins, and will cause the speed record to be immediately made in the manner hereinbefore set forth, not only on the vehicle struck, but on the one doing the striking.

The bell cranks 41 then contact with the bars 5, breaking the pin 42 and allowing the projected bell crank arms to move rearwardly, while the other bell crank arms then move down and around the bars, enclosing them in the area between the forks and said arms.

Suitable catch lugs or detents 43 on the forks then act to hold the bell cranks in their bar embracing positions, preventing separation of the two vehicles from each other.

After the bars have been rotated the necessary distance to actuate the speed record, which is determined by the depth of the bar-fins relative to the forks, further pressure of the latter against the bars causes the latter to move inwardly compressing the springs 8 and 15, and causing the corresponding wire 31, which has already functioned, to become slack.

The wires 31 and 39 are so arranged of course that anyone may move without necessitating any movement of the others.

Similarly, each bar 11 will function independent of the other, and each bar 5 will function independently of the other or of the bars 11.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A fender structure for automobiles comprising in combination with fender bars mounted on the vehicle and a speedometer mounted thereon, means between the bars and speedometer whereby a visible and permanent record of the speed of the vehicle at the time the bars are struck will be obtained.

2. A fender structure for automobiles comprising in combination with fender bars mounted on the vehicle and a speedometer mounted thereon, said speedometer having a speed indicating needle and a dial, a marking device on the needle, and means actuated by the force of a horizontal blow delivered against the bars for causing the marking device to imprint a mark on the dial.

3. A fender structure for automobiles comprising in combination with fender bars mounted on the vehicle and a speedometer mounted thereon, said speedometer having a speed indicating needle and a dial, the latter being movable toward the needle and normally spaced therefrom, a marking element carried by the needle, and means actuated by the initial force of a horizontal blow against the fenders for causing the dial to be moved to be engaged by the marking element.

4. A fender structure for automobiles comprising in combination with fender bars, turnably mounted along the sides of the vehicle and a speedometer likewise mounted on the vehicle, said speedometer having a speed indicating needle and a dial movable theretowards, a marking element carried by the needle, means between the bars and dial for moving the latter into engagement with the marker with the rotation of the bars, and means for rotating said bars.

5. A fender structure for automobiles comprising in combination with fender bars, turnably mounted along the sides of the vehicle and a speedometer likewise mounted on the vehicle, said speedometer having a speed indicating needle and a dial movable theretowards, a marking element carried by the needle, means between the bars and dial for moving the latter into engagement with the marker with the rotation of the bars, rear fenders on the vehicle arranged for horizontal movement, and means between the side and rear fenders whereby when such movement is imparted to the latter the side fenders will be rotated.

6. A fender structure for automobiles comprising in combination with fender bars, turnably mounted along the sides of the vehicle and a speedometer likewise mounted on the vehicle, said speedometer having a speed indicating needle and a dial movable theretowards, a marking element carried by the needle, means between the bars and dial for moving the latter into engagement with the marker with the rotation of the bars, rear fenders on the vehicle, arranged for horizontal movement, and means between the side and rear fenders whereby when such movement is initially imparted to the latter the side fenders will be rotated through a predetermined arc, but with any further movement of said end fenders the rotation of the side fenders will cease.

7. A fender structure for automobiles comprising in combination with fender bars, turnably mounted along the sides of the vehicle and a speedometer likewise mounted on the vehicle, said speedometer having a speed indicating needle and a dial movable theretowards, a marking element carried by the needle, means between the bars and dial for moving the latter into engagement with the marker with the rotation of the bars, rear fenders on the vehicle arranged for horizontal movement, and means between the side and rear fenders whereby when such movement is imparted to the latter the side fenders will be rotated, and means whereby the side fenders may be rotated alone without imparting any movement to the rear fenders.

In testimony whereof I affix my signature.

OSCAR E. JONES.